UNITED STATES PATENT OFFICE.

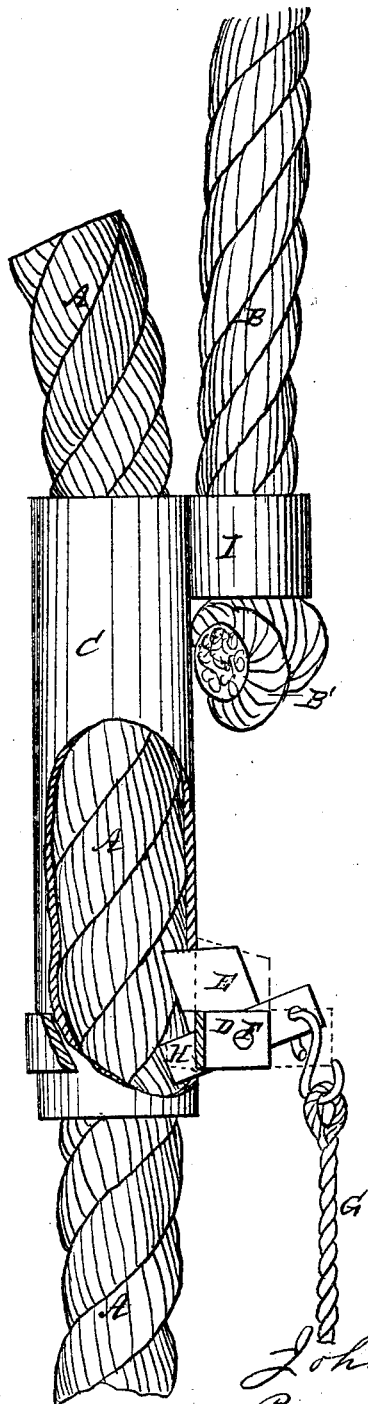

JOHN GIFFORD, JR., OF WATERTOWN, NEW YORK.

IMPROVEMENT IN HAY-ELEVATORS.

Specification forming part of Letters Patent No. 59,585, dated November 13, 1866.

*To all whom it may concern:*

Be it known that I, JOHN GIFFORD, Jr., of Watertown, in the county of Jefferson and State of New York, have invented a new and Improved Device for Adjusting the Length of a Loading-Rope in Hay and Manure Loaders; and I do hereby declare the following to be a full, clear, and exact description of the same, sufficient to enable one skilled in the art to which the invention appertains to make use of it, reference being had to the accompanying drawing, which forms a part of this specification, in which my invention is represented by an elevation.

The improvement consists of a means of griping the loading-rope and fastening it to the tubular socket which is suspended from the rope which passes to the pulley.

In the drawing, B represents the rope which is suspended from the pulley or other elevating device, and is attached by the ring I to the socket C, through which passes the rope A, which is attached to the hay or manure fork at its lower end.

It becomes necessary at times to shorten the length of the rope between the socket C and the fork, and this is done by pulling the rope A through the socket, and the means for detaining it in the required position constitute the novelty of my invention.

Owing to the inequalities of the surface and differences of level of the ground on which the wagon is standing, and the manure or hay which is being loaded, and in cases when the wheels of the wagon are in a hollow, ditch, or dead-furrow, it becomes necessary to shorten the fork-rope as the easiest means of adjusting the length of rope to the duty. The rope A being drawn through the socket C, or as far as may be desired, the tooth E is vibrated on its pivot F and its point caused to come in close contact with or penetrate the rope A, so that a downward draft on the rope A will draw against the tooth and the rope will not slip. The flanges H also aid in embracing the rope A when in position against it. The tooth is pivoted in a flange, D, attached to the socket, and is released when required by drawing upon the rope G, thereby freeing the rope A.

What I claim as new, and desire to secure by Letters Patent, is—

The combination, with the socket C, of the ropes A B and the pivoted detaining-tooth E, operating substantially as described.

JOHN GIFFORD, JR.

Witnesses:
 JOHN B. BALL,
 EDGAR WESTCOTT.